United States Patent [19]

Ruscitti et al.

[11] 4,434,916

[45] Mar. 6, 1984

[54] MANUALLY OPERATED LIQUID DISPENSING PUMP

[75] Inventors: Tomaso Ruscitti; Giovanni Albini; Roberto Torretta; Andrea Incerti Baldi, all of Milan, Italy

[73] Assignee: S.A.R. S.p.A., Teatino, Italy

[21] Appl. No.: 336,189

[22] Filed: Dec. 31, 1981

[30] Foreign Application Priority Data

Jan. 7, 1981 [IT] Italy .............................. 19026 A/81

[51] Int. Cl.[3] .............................................. G01F 11/36

[52] U.S. Cl. ...................................... 222/321; 222/385

[58] Field of Search .......................... 222/321, 383–385

[56] References Cited

U.S. PATENT DOCUMENTS

| | | | |
|---|---|---|---|
| 3,500,761 | 3/1970 | Clevenger | 222/321 |
| 3,583,605 | 6/1971 | Corsette | 222/321 |
| 4,087,025 | 5/1978 | Steiman | 222/321 |
| 4,162,746 | 7/1979 | Anderson | 222/321 X |
| 4,193,551 | 3/1980 | Saito et al. | 222/383 X |

*Primary Examiner*—Joseph J. Rolla
*Assistant Examiner*—Kevin P. Shaver
*Attorney, Agent, or Firm*—Oblon, Fisher, Spivak, McClelland & Maier

[57] ABSTRACT

The invention relates to a pump applicable to containers holding a substance to be delivered or dispensed under pressure, which pump is manually operable. The pump includes a hollow stem movable within a hollow body, urged out of the latter by a spring and retained therein by a ring sealingly connectable or hookable on a ring nut which can be secured on the mouth or inlet member of a substance container. A seal of H-cross-section is mounted and movable on the stem and by its lips seals on the inner surface of the hollow body, on the outer surface of the stem, on a tubular extension projecting from the above mentioned ring, and respectively in either of two annular grooves presented by the stem or bodies associated therewith. On moving between such grooves during the movement of the stem, the seal closes or clears a channel through which the pressure substance can exit as previously sucked within the hollow body, which bears on the outward facing surface of an annular edge projecting from the ring nut. Thus, the same body of the pump can be applied on containers of different sizes, by merely changing its supporting and fastening ring nut on each container, and additionally the pump body cannot fall within the container, whenever pressure is applied on its stem.

1 Claim, 2 Drawing Figures

MANUALLY OPERATED LIQUID DISPENSING PUMP

Figure 1:
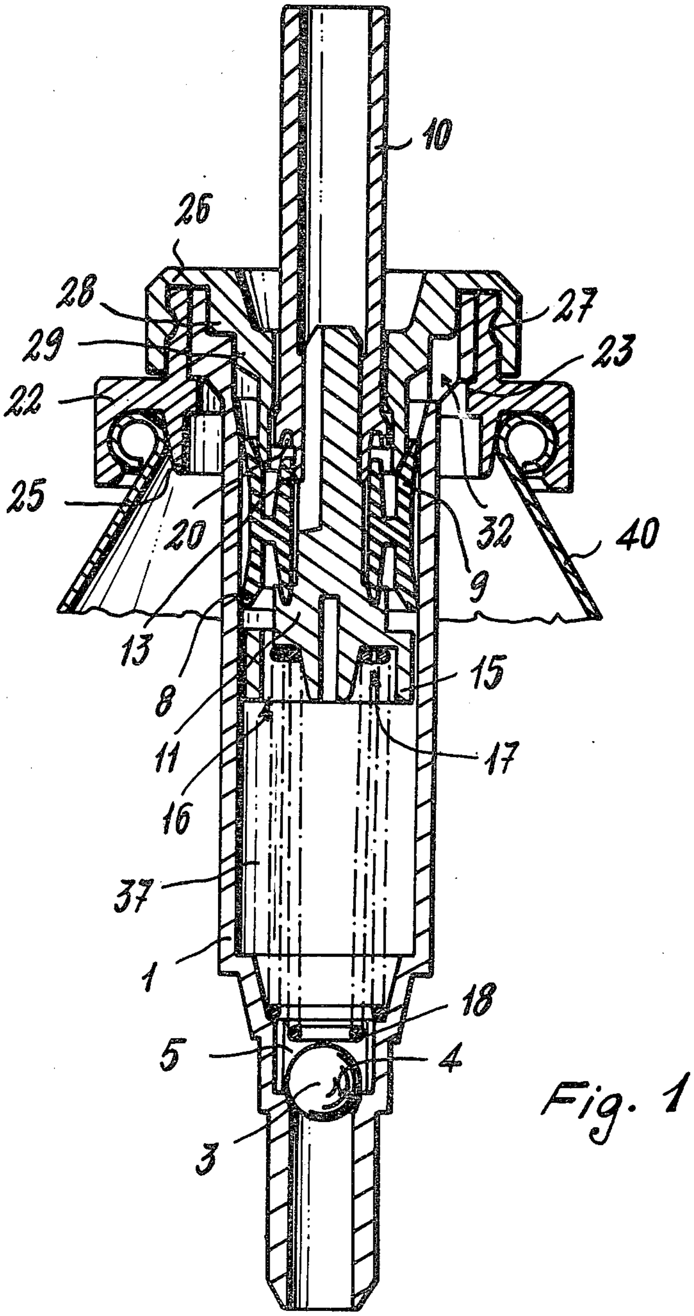

This invention relates to a manually operated pump for pressure delivery of liquid and/or thick substances contained in containers on which the pump is mounted.

Known are many types of pumps applicable on containers of liquid substances or materials, which pumps comprise a manually operable stem, by which at the stem upward movement step a dose of substance can be sucked in a compression chamber forming part of the pump and respectively at the downward movement step of the stem, the substance can be ejected under pressure through a cavity in the stem and a dispensing cap mounted on its free end.

In U.S. Pat. No. 3,211,346 and U.S. Pat. No. 4,113,145 pumps of the above mentioned type are disclosed, in which the compression chamber is closed at the bottom by an elongated extension projecting from the hollow stem. Such a structure suffers from the disadvantage that, at the substance or material suction step, while the stem travels the first upward distance or length, the compression chamber remains closed by said extension and a vacuum develops therein.

On continued upward movement of the stem, the lower aperture of the chamber suddenly opens, in which the substance or material is sucked at high speed: if the material is of creamy nature, serious problems occur in the material suction and correct filling of the compression chamber. Moreover, such pumps have the upper end of the body thereof projecting as a shaped flange, by which they can be bound to the mouth or inlet member of the containers. Since the mouth or inlet members of the containers often have different diameters, as a result each pump is applicable only to containers having a mouth or inlet member of well defined diameter.

In U.S. Pat. No. 3,187,960 and U.S. Pat. No. 3,500,761 there are shown pumps also having the disadvantage of being fitted with a flange projecting from the main body thereof and by which they can be bound to the mouth or inlet member of the containers: obviously, also in this case, for different mouth or inlet members, different pumps must be used. Additionally, in the pumps disclosed in these two patents, the compression chamber is kept closed at the bottom by a small ball housed within a suitable seat having a shaped sealing surface. The hollow stem, which is axially movable, is guided only for a very short length of its body, thus tending to oscillate during its operation, deforming and rapidly wearing out the seal which is mounted thereon and which is effective as movable plunger or piston closing and opening the sealing chamber at the top. Thus, such a seal is necessarily made of extremely soft and deformable material.

It is the primary object of the present invention to provide a pump of the above mentioned type, which is applicable to containers with mouth or inlet member having diameters also considerably different from one another by merely replacing a fastening ring nut, and which comprises a slide guiding the stem at its lower free end, preventing side oscillations thereof and thus maintaining integral the plunger seal of soft material for a much extended use.

It is another object of the invention to ensure that the plunger seal will provide a perfect seal on the stem and walls of the hollow body in which it is movable, both during the suction step and during the compression and ejection step of the substance or material to be delivered or dispensed.

These and still further objects are achieved by a manually operated pump for pressure delivery of liquid and/or thick substances contained within a container on which the pump is mounted, comprising an elongated hollow body having a small tube mounted at the lower end thereof, which small tube draws within the substance to be delivered or dispensed, an elongated hollow stem, the lower end of which is housed and movable within the hollow body, in the lower portion of which a metering chamber is defined, a spring enters such a chamber and by reacting between the chamber bottom and stem urges the latter outwardly of the hollow body, a ball housed in the lower zone of the metering chamber, where it is movable between a shaped seat formed on the lower end of the chamber and on which the ball bears and seals and a stop comprising the lower end of the spring, a retaining element bound to the upper end of the hollow body and preventing the stem from being unthreaded from the hollow body, an element for anchoring the pump on the mouth or inlet member of the container, the stem portion internally of the hollow body having mounted thereon a movable seal with sealing lips on the stem and inner surface of the hollow body, the movable seal being movable between a position, at which it clears at least one channel communicating the metering chamber and the stem cavity, and a position at which it closes such a channel, characterized in that a guide element facing the inner surface of the hollow body and preventing side oscillations of the stem and parts associated therewith stands from the lower end of the stem, that said seal is of substantially H cross-section with two outer lips sealingly movable on the inner surface of the hollow body and with two inner lips movable between two shaped annular seats between which the lower end of said channel opens, and in which seats said upper and respectively lower inner lips can be sealingly arranged, the upper inner lip always sealing on the stem surface, a shaped tubular extension inwardly extending of the hollow body adjacent the upper end thereof and surrounding said stem, under rest or inoperative conditions of the pump said outer upper lip of the seal contacting with and sealing on such a tubular extension, a clearance being provided for the passage of air between said stem and said anchoring element, and in the upper part of the hollow body at least one aperture being provided at or above the lower edge of said tubular extension.

Figure 2:
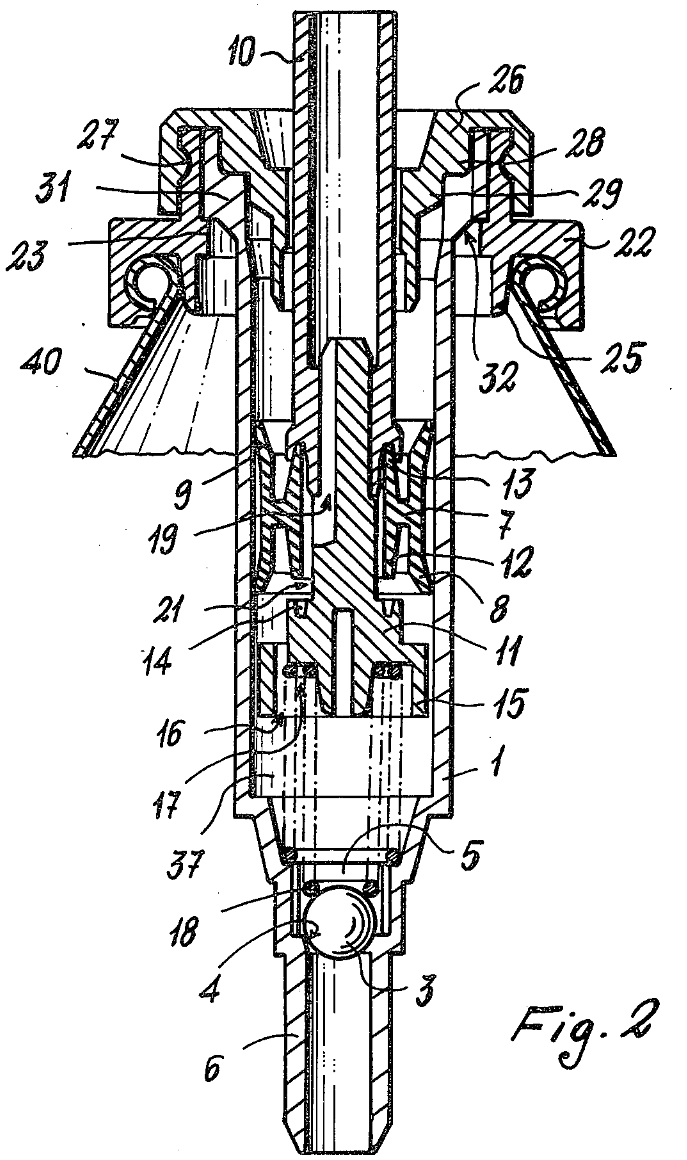

In order that the structure and features of the pump according to the invention be more clearly understood, a preferred embodiment thereof will now be described with reference to the accompanying drawings, in which:

FIG. 1 is a diagrammatic longitudinal sectional view showing the pump at rest or inoperative position; and FIG. 2 is a view showing the same pump at the step of maximum lowering or downward movement of the stem.

The pump comprises a hollow body 1 having at the bottom a housing 5 for a ball 3. A seat 4 is formed in the ball housing and shaped for sealing when contacting therewith. At the side of said ball housing, ribs or splines are provided for guiding the ball, while leaving a considerable space for the passage of the substance or material to be dispensed when the pump is sucking and the ball is raising.

The lower end of body 1 has applied thereto a small tube 6 drawing in the product to be pumped.

The sucking and pressing action of the pump is provided by a seal 7 of H cross-section and which has a lower outer lip 8 for the pumping action and an upper outer lip 9 for the sucking action. This seal 7 is housed and movable within a seat provided through the coupling of a stem 10 a shaped body 11.

Said seal 7 also has two inner lips 12 and 13 coupling at the bottom with an annular seat 14 of body 11 and at the top with an annular seat 20 at the lower end of stem 10.

The above mentioned body 11 is implemented so that a guide element 15 projects from its lower end and prevents the stem-seal assembly from oscillating, whereby the seal lips of soft nature always correctly operate by coaxially translating with the interior of body 1. The guide element 15 leaves wide free passages 16 for an easy passage of the substances or materials, even thick materials, to be dispensed, while the lower end of body 11 has a bearing or support 17 for a return spring 18.

The coupling between said stem 10 and body 11 clears channel 19 for the flow of the substance or material to be dispensed upon ejection from the pump.

When the pump is at pressing condition, the seal 7 will encounter resistance in the substance or material contained within the pump. Thus, a contact occurs between the upper inner lip 13 of the seal and the lower end portion of stem 10 in its seat 20. The lower inner lip 12 of seal 7 disengages from the seat 14 of body 11 and clears an access passage 21 to the channel 13.

Thus, the substance or material passes through the passages 16, 21 and 19 and flows internally of stem 10 directed to the dispenser.

The return spring 18 is biconical so that however mounted it holds the ball 3 in its housing, avoiding an excess raising or entering thereof within the spring.

This is because, when the pump is used with very thick substances or materials, should the ball be raised to excessive extent, as dragged by the thick substance or material and not being too heavy, it would not fall at once, but would remain entrapped in the thick substance or material, with the result that upon a plurality of successive operations without any interval and not closing immediately the seat 4 of housing 2, a back flow would be allowed for a portion of the substance or material sucked in the bottle.

The upper part of body 1 has an enlargement which is housed within the proper seat of a ring nut 22 which by suitable systems, in the case of the drawing by a joint system, is coupled to the container 40 of the substance or material to be dispensed.

However, it clearly appears that said ring nut may have an inner thread, by which it can be screw secured on the threaded neck portion of a container. The body 1 is introduced into said ring nut 22 from top to bottom until contacting with the edge 23 of the ring nut supporting it.

Thus, the substantial advantage is obtained that said body 1 is also the same for pumps suitable for containers having neck portions of different dimensions and/or with different coupling systems between said ring nut 22 and the container. Thus, it is only needed to introduce the body into ring nuts with outside of different shape and/or dimensions and obviously suited for the container neck on which the pump should be applied.

Additionally, as the pump body is thereby supported from beneath by the ring nut edge 23, it is impossible, when the pump is operated, that it may unthread from the ring nut and fall down into the container, whatever is the pressure force applied from top to bottom for operating the pump.

The sealing between the ring nut and container may be provided by means of a seal (not shown), or by means of a suitable extension 25 projecting from the ring nut 22.

The assembly comprising said body 11, inner seal 7 and stem 10, urged by spring 18, is retained within body 1 by the ring 26 which, as connected or hooked to ring nut 22, also retains body 1 in said ring nut 22 engaging both with said body 1 and said ring nut.

The various parts of these three above mentioned components perform the following functions.

The rib 27 projecting from the ring 26 engages in a corresponding annular seat of the ring nut 22 and retains such a ring at the predetermined position.

A step 28 in said ring 26 resists from inside on the end portion of body 1, preventing the latter from flexing under the action of thrusts transmitted outwardly of ring 26. A step 29 in ring 26 is for centering the downward projecting tubular extension 30 of ring 26 to assure a smooth and uniform contact of such an extension with the inner part of the upper lip 9 of seal 7.

This step 29 also connects with ribs 31 on the inner part of the upper enlargement of body 1, which define empty spaces 32 communicating the outer part of body 1 with the inner part.

When the pump is dispensing or delivering, an air volume may enter the container from the external environment, which volume is equal to the volume of ejected substance or material, through the clearance existing between the cylindrical portion of stem 10 and ring 26, the inner part of the body defined at the bottom by seal 7, and the empty spaces 32.

This avoids the formation of a vacuum within the container as the amount of product remaining in the container decreases. In order to operate the pump, a pressure is exerted on the top of the dispenser (not shown) which is applied to the upper end of stem 10. When the pump is at rest or inoperative, the following conditions occur: the spring 18 upward urges the body 11 which engages and seals by its seat 14 with the lower inner lip 12 of seal 7. In turn, still under the action of spring 18 resists via the inner part of the upper lip 9 against the lower edge of the tubular extension projecting from the retaining ring 26, whereas the upper inner lip 13 of seal 7 provides for sealing with the lower end cylindrical portion of stem 10.

Under these conditions, any exit or outlet of substance or material from the container is inhibited.

Thus, the substance or material in the metering chamber 37 cannot exit even if for accidental causes a pressure should build up in the container, as prevented by the lower outer lip 8 of the seal providing for sealing on the inner wall of body 1 and by the lower inner lip 12 of seal 7 engaging with the seat 14 of body 11.

Then, under the rest or inoperative conditions described, should the container be placed at overturned position, the product from the interior of the container would travel through the passages 32 of the upper enlargement of body 1, and would be retained on one hand by the upper outer lip 9 of the inner seal 7 engaging with its outer part with the wall of body 1 and with the inner part with the edge of the tubular extension projecting from ring 26 and, on the other hand, both by said step 28 of ring 26 engaging with the end portion of the enlargement of body 1, and by the rib 27 and its adjacent parts engaging with the corresponding parts of ring nut 22.

Moreover, any residual substance or material on the inner parts of stem 10 and dispenser thereon applied, would remain in situ due to the sealing action exerted by the upper inner lip 13 of seal 7 with the end cylindrical portion of stem 10. By downward pressing on the upper portion of stem 10, the pump is brought to dispensing or delivery state. Then, the following conditions are met. The stem 10 moves in a downward direction. However, the seal 7 cannot initially follow the stem movement due to the presence of substance or material in the metering chamber 37 of body 1, which substance or material cannot exit as prevented at the bottom by the presence of ball 3 sealing with the seat 4 of body 1, and at the top by the engagement of the lower inner lip 12 of seal 7 with the seat 14 of body 11.

Then, a relative movement occurs between the integral unit or assembly comprising said stem 10 and body 11 and said seal 7. By this relative movement the lower inner lip 12 of seal 7 leaves the seat 14 of body 11 and the upper inner lip 13 sealingly engages with the seat 20 of stem 10.

Thus, a passage opens in communication between the metering chamber 37 of body 1 and the external environment through the passages 16 of body 11, the passage being formed between the lower inner lip 12 of seal 7 and body 11, the channels 19 existing between the body 11 and stem 10 and the inner hollow parts of stem 10 and dispenser thereto applied. Under the pressing action exerted on stem 10, this enables the seal 7 to move downwards and eject the substance or material present in said chamber 37.

Thus, the above described passage communicating between the metering chamber 37 and external environment is the only existing passage, being at the bottom the passage to the container occluded by ball 3, and at the top any exit being prevented by the engagement of the lower outer lip 8 of seal 7 with the wall of the metering chamber and by the upper inner lip 13 of seal 7 with the seat 20 of the lower portion of stem 10.

When, after travelling through its entire stroke the pump is released, the spring 18 upward urges the body 11 and stem 10 connected thereto. Initially, such elements effect a relative movement with respect to seal 7, the latter being maintained still or stationary by the friction of the two outer lips with the inner wall of body 1. This relative movement causes the lower inner lip 12 of seal 7 to engage with the seat 14 of body 11 and accordingly the closing of the passage of communication between the metering chamber 37 and the external environment.

As a result of said engagement, also said seal 7 upward moves. Thus, since any communication between the metering chamber 37 and external environment is precluded, a vacuum is caused in the metering chamber and hence a suction of substance or material from the container, on which the pump is applied.

Finally, the above described retaining ring 26 performs the functions of guiding said stem 10, retaining the unit or assembly comprising said stem 10, body 11 and seal 7 within said body 1, retaining said body 1 in said ring nut 22, and sealing with said seal 7.

What we claim is:

1. A manually operated pump for the delivery of viscous liquid stored within a container upon which said pump is mounted, said pump comprising:

a ring nut mounted on a mouth of said container, said ring nut including a first annular shoulder and an annular seal extending into said container;

a pump body comprising a hollow cylinder having an axis and a ring at one end, said ring resting upon said first shoulder of said ring nut for supporting said pump body in the axial direction, said ring having a pressure equalization opening, said hollow cylinder having a second end extending into said container and including an annular internal valve seat and a product drawing tube coaxial with said cylinder and communicating with said cylinder via said valve seat;

a ball valve in said second end and engageable with said valve seat;

a closure ring mounted on said ring nut and having a center circular opening coaxial with said pump body;

a hollow delivery stem extending through said central opening of said closure ring, said hollow stem having a lower end positioned inside said pump body, said lower end of said stem including a first annular projection having a first annular downwardly extending lip, said lower end of said stem and said first lip together defining walls of a first annular concave seat;

a shaped body in said pump body, said shaped body having a cylindrical mid-portion and an upper end extending into said hollow stem, said upper end of said shaped body including a delivery passage whereby said liquid may be introduced into said hollow stem at said lower end thereof, said shaped body having a lower end including an annular guide portion having an outer diameter substantially equal to an inner diameter of said hollow cylinder of said pump body, whereby said hollow stem and shaped body are guided in the axial direction, said mid-portion of said shaped body including a second annular projection having a second annular upwardly extending lip, said cylindrical mid-portion and said second lip together defining walls of a second annular concave seat spaced from said first seat by a first distance;

conical spring means extending between said ball valve and said lower end of said shaped body for biasing said ball valve into engagement with said valve seat and for biasing said shaped body and said hollow stem in a direction away from said valve seat; and a soft elastic seal positioned in said pump body between said first and second annular concave seats, said seal comprising:

(a) an inner cylindrical portion closely surrounding said mid-portion of said shaped body in a slidable manner, the axial height of said inner portion being less than said first distance, whereby said seal is axially movable between a first position in which an upper end of said inner portion is inserted into said first concave seat so as to open said delivery passage of said shaped body, and a second position in which a lower end of said inner portion is inserted into said second concave seat so as to seal said delivery passage of said shaped body, (b) an outer cylindrical portion adjacent the inner cylindrical walls of said hollow cylinder of said pump body, said outer portion having axial ends bent into engagement with said inner cylindrical walls of said hollow cylinder of said pump body so as to form annular seals therewith, and (c) an annular connecting portion connecting said inner and outer cylindrical portions.

* * * * *